Patented Aug. 7, 1951

2,563,502

UNITED STATES PATENT OFFICE 2,563,502

PORCELAIN ENAMEL AND METHOD OF MAKING SAME

Benjamin J. Sweo, Lakewood, Ohio, assignor to Ferro Enamel Corporation, Cleveland, Ohio, a corporation of Ohio No Drawing. Application August 13, 1949, Serial No. 110,235

16 Claims. (Cl. 106—48)

This invention relates as indicated to porcelain enamels and has more particular reference to porcelain enamels characterized by higher film strength, resistance to tearing, and higher acid resistance than any porcelain enamels heretofore produced.

In the art of porcelain enameling, frit is ground in water to a predetermined fineness in the presence of various electrolytes, opacifying agents, and clay or clay-like materials. The clay or clay-like materials are added to provide suspending and binding properties to the milled porcelain enamel. Although clays or clay-like materials exhibit desirable suspension properties, as binding agents to provide film strength in the bisque coat prior to and during the firing step they are definitely limited. Furthermore, in the art of porcelain enameling as now practiced the application of ceramic materials containing clay to ferrous work pieces is accompanied by gas evolution attendant with the following reaction:

$$Fe + H_2O \rightleftharpoons FeO + H_2 \uparrow$$

The water for the above reaction is supplied by the clay. Since the clay is hydrous, during the step of firing the bisque coat onto the ferrous work piece the clay undergoes dehydration thus liberating its water. The water thus liberated reacts with the ferrous work piece, as shown above with the liberation of hydrogen. The liberated hydrogen gas in its attempt to escape forces its way through the melting enamel causing subsequent bubbles. It has further been ascertained and is well known to those skilled in the art of porcelain enamel manufacture, the acid resistance of porcelain enamels is a direct function of the amount of clay used as a suspending and binding agent in the milling operation. That is, the more clay used during the milling operation the lower the acid resistance.

The present invention is based on the discovery that various fibrous materials can be wholly or partly substituted for the clay as the mill addition and thus produce an enamel which overcomes all the aforementioned objections.

It is therefore a principal object of this invention to provide a new and novel porcelain enamel and method for producing same.

Another object of this invention is to produce a porcelain enamel with improved tear resistance.

A further object of this invention is to produce a porcelain enamel with improved acid resistance.

Other objects will become apparent as the description proceeds.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention comprises the discovery of a superior porcelain enamel slip characterized by the inclusion therein of fibrous materials.

It has long been recognized by those skilled in the art of porcelain enameling that although clay or clay-like materials are ideal materials for suspending ground porcelain frit in water the clay does not act as a completely satisfactory binding agent. That is, after the enamel slip has been applied to the metal work piece, the bisque coat shows a tendency to "tear" prior to and during vitrification. I have found that by substituting fibrous material wholly or in part for the mill addition clay I can produce a porcelain enamel with superior tear resistance. I have found that any of the inorganic fibrous materials such as, the various types of asbestos, rock wool, glass wool, fiber glass, and fibrous silica are satisfactory materials for producing the enamel of this invention.

In the preferred embodiment of the present invention I prefer to use glass fiber of from 20 microns to 100 microns in length and from 2 to 5 microns in diameter. I have found that longer fibers cause a balling effect due to their length and when applied to the work piece and fired cause a defect on the finished work piece. In combination with the glass fiber I use ¼ to ½ part by weight of potassium chloride. However, any of the well known electrolytes such as sodium nitrite, sodium aluminate, potassium carbonate, etc., may be used as setting up agents. If desired 0.5 to 1.5 parts by weight of bentonite or other clay like materials may be used in place of or in combination with the aforementioned electrolytes.

So that the present invention may be more readily understood the following table is given:

I

[All ingredients in the following table are parts by weight]

|  | A | B | C |
| --- | --- | --- | --- |
| Frit | 100 | 100 | 100 |
| Opacifier | 1 | 1 | 1 |
| Clay | 4 | | 1 |
| Glass Fiber | | 2½ | 2½ |
| Electrolyte | ¼ | ¼ | |
| Water | 38 | 38 | 38 |

Example "A" is a typical formulation for producing the conventional ground enamel for application to a metal work piece. Example "B" shows the formulation for producing the ground enamel of this invention. Work pieces sprayed and fired with this enamel slip show superior tear resistance, very high acid resistance, and superior scratch resistance. Example "C" is a formulation using glass fibers plus a small amount of clay. While this enamel is definitely superior to "A" it does not have the acid resistance and scratch resistance of "B."

Although in the preferred embodiment of my invention I do not use clay I have found that in some isolated instances small amounts of bentonite (0.5%–2%) or other clays can be used without too much detrimental effect. One instance where the use of bentonite would be desirable is in the case where a "high set" is wanted. That is, if a slip were made using more than the normal 38% to 40% water a small amount of bentonite would be used to bring up the "set" of the slip and thus the proper suspension could be obtained without readjusting the fiber content of the slip.

Although Table I shows the use of 2½ parts of fibrous material per 100 parts of frit it is to be understood that this figure represents the weight of fiber having a diameter of 2 to 5 microns. If a fibrous material having a diameter less than 2 microns is used the weight of material used would be proportionately less. This is true since the suspending and binding properties of the fibrous materials are a function of the length of the fibers. Thus if a fiber of smaller diameter was used it would take proportionately less weight of the fiber to give the same total length of fiber of larger diameter.

I have found that approximately 2 grams of glass fiber per 100 grams of frit gives adequate suspending and binding properties to the porcelain enamel slip. Thus 2 grams of glass fibers of an average diameter of 3 microns would equal about 61.6 miles of fibers. Therefore since I have found that 2 grams of glass fiber gives sufficient suspending and binding properties per 100 grams of frit, 61.6 miles of glass fiber can be assumed to be the length of fiber necessary to give proper suspending and binding properties. Thus if glass fibers of 0.5 micron in diameter were used it would only take about 0.05 gram of fiber per 100 grams of frit to equal 61 miles of fiber.

It is of the utmost importance to note that the fibrous material, used in the enamel slip of this invention, must be at least twice the length of the diameter of the minimum frit particle and at least twice the length of its own diameter. However, the maximum length of the fibrous material being not over 100 microns and not more than 15 microns in diameter. With this in mind it can now be readily seen that I have established a condition wherein at least two or more particles of frit can attach themselves to a fibrous particle. The fibrous materials having length become intertwined with each other and thus a surface is formed with suspending properties. Further the fibrous materials serve to bind the particles of finely ground frit and improved tearing resistance is obtained.

From the aforementioned discussion it can now be readily seen that such substances as powdered glass could not be used in lieu of glass fibers. Powdered glass is substantially spherical in shape and therefore would not have any more suspension or binding properties than ground frit.

Heretofore it has never been possible to use successfully porcelain enamel milled beyond a certain fineness, although it is well known to those skilled in the art of porcelain enameling that the finer the frit is ground the greater its covering and suspending power. However, when frit is too finely ground, its tendency to "tear" before and during vitrification on the work piece greatly increases the finer the frit particles are milled. I have found that by using the various inorganic fibrous materials, previously discussed, in place of the clay mill addition, it is now possible to mill porcelain enamel frit to a fineness of 1 micron or less and apply and fire this superfine frit to a work piece without tearing.

From the foregoing discussion it will readily be seen that there has been provided a porcelain enamel slip with tearing resistance, acid resistance, and scratch resistance heretofore never obtained with porcelain enamel slip containing only clay or clay-like materials as the suspending and binding agent.

Other modes of applying the principle of the invention may be employed provided the features stated in any of the following claims or the equivalent of such be employed.

I therefore particularly point out and distinctly claim as my invention:

1. A ceramic slip comprising a liquid suspension of finely divided frit which suspension contains from about 0.05% to about 50% per 100 parts frit of a non-metallic inorganic fibrous material consisting substantially entirely of fibers having a fiber diameter which is on the order of from 0.5 micron to about 15 microns and the length being at least twice the length of the diameter of the minimum frit particle and not over 100 microns.

2. A ceramic slip comprising a liquid suspension of finely divided frit on the order of about 1 micron particle size which suspension contains from about 0.05% to about 50% per 100 parts frit of a non-metallic inorganic fibrous material consisting substantially entirely of fibers having a fiber diameter which is on the order of from about 0.5 micron to about 15 microns and the length being at least twice the length of the diameter of the minimum frit particle and not over 100 microns.

3. A porcelain enamel slip comprising a liquid suspension of finely divided frit which suspension contains from about 0.05% to about 50% per 100 parts frit of glass fibers consisting substantially entirely of fibers having a fiber diameter of from about 0.5 micron to about 15 microns and the length being at least twice the length of the diameter of the minimum frit particle and not over 100 microns.

4. A porcelain enamel slip comprising a liquid suspension of finely divided frit which suspension contains from about 0.05% to about 50% per 100 parts frit of asbestos fibers consisting substantially entirely of fibers having a fiber diameter of from about 0.5 micron to about 15 microns and the length being at least twice the length of the diameter of the minimum frit particle and not over 100 microns.

5. A porcelain enamel slip comprising a liquid suspension of finely divided frit which suspension contains from about 0.05 to about 50% per 100 parts frit of fibrous silica consisting substantially entirely of fibers having a fiber diameter of from about 0.5 micron to about 15 microns and the length being at least twice the length of the diameter of the minimum frit particle and not over 100 microns.

6. The method of preventing settling of solid components of a liquid suspension of finely divided porcelain frit which comprises adding to such suspension from about 0.05% to about 50% per 100 parts frit of a non-metallic inorganic fibrous material consisting substantially entirely of fibers having a fiber diameter is on the order of from about 0.5 micron to about 15 microns and the length being at least twice the length of the diameter of the minimum frit particle and not over 100 microns.

7. The method of preventing settling of solid components of a liquid suspension of finely divided porcelain enamel frit which comprises adding to such suspension from about 0.05% to about 50% per 100 parts frit of glass fibers consisting substantially entirely of fibers having a fiber diameter of from about 0.5 micron to about 15 microns and the length being at least twice the length of the diameter of the minimum frit particle and not over 100 microns.

8. The method of preventing settling of solid components of a liquid suspension of finely divided porcelain enamel frit which comprises adding to such suspension from about 0.05% to about 50% per 100 parts frit of asbestos fibers consisting substantially entirely of fibers having a fiber diameter of from about 0.5 micron to about 15 microns and the length being at least twice the length of the diameter of the minimum frit particle and not over 100 microns.

9. The method of preventing settling of solid components of a liquid suspension of a finely divided porcelain enamel frit which comprises adding to such suspension from about 0.05% to about 50% per 100 parts frit of fibrous silica consisting substantially entirely of fibers having a fiber diameter of from about 0.5 micron to about 15 microns and the length being at least twice the length of the diameter of the minimum frit particle and not over 100 microns.

10. The method of producing a fired coating of porcelain enamel of improved acid resistance, tear resistance, and scratch resistance which comprises adding to the slip before firing from about 0.05% to about 50% per 100 parts frit of a non-metallic inorganic fibrous material consisting substantially entirely of fibers having a fiber diameter which is on the order of from about 0.5 micron to about 15 microns and the length being at least twice the length of the diameter of the minimum frit particle and not over 100 microns.

11. The method of producing a fired coating of porcelain enamel of improved acid, tear resistance, and scratch resistance which comprises adding to the slip before firing, from about 0.05% to about 50% per 100 parts frit, of glass fibers consisting substantially entirely of fibers having a fiber diameter of from about 0.5 micron to about 15 microns and the length being at least twice the length of the diameter of the minimum frit particles and not over 100 microns.

12. The method of producing a fired coating of porcelain enamel of improved acid resistance, tear resistance, and scratch resistance which comprises adding to the slip before firing from about 0.05% to about 50% per 100 parts frit of asbestos fibers consisting substantially entirely of fibers having a fiber 0.5 micron to about 15 microns and the length being at least twice the length of the diameter of the minimum frit particle and not over 100 microns.

13. The method of producing a fired coating of porcelain enamel of improved acid resistance, tear resistance, and scratch resistance which comprises adding to the slip before firing from about 0.05% to about 50% per 100 parts frit of fibrous silica consisting substantially entirely of fibers having a fiber diameter of from about 0.5 micron to about 15 microns and the length being at least twice the length of the diameter of the minimum frit particle and not over 100 microns.

14. A porcelain enamel slip comprising 100 parts of frit, from 1% to 4% opacifier per 100 parts frit, from 0.25% to 0.75% electrolyte per 100 parts frit, from 32% to 55% water per 100 parts frit, from about 0.05% to about 50% of a non-metallic inorganic fibrous material consisting substantially entirely of fibers having a fiber diameter of from about 0.5 micron to about 15 microns and the length of said fibers being at least twice the length of the diameter of the minimum frit particle and not over 100 microns.

15. A porcelain enamel slip comprising 100 parts of frit, from 1% to 4% opacifier per 100 parts frit, from 0.25% to 0.75% electrolyte per 100 parts frit, from 32% to 55% water per 100 parts frit, from 0.5% to 2% bentonite per 100 parts frit, and from about 0.05% to about 50% of a non-metallic inorganic fibrous material consisting substantially entirely of fibers having a fiber diameter of from about 0.5 micron to about 15 microns and the length of said fibers being at least twice the length of the diameter of the minimum frit particle and not over 100 microns.

16. A porcelain enamel slip comprising 100 parts of titanium frit, 1% titanium oxide per 100 parts frit, 0.25% potassium chloride per 100 parts frit, 38% water per 100 parts frit, and 2.5% glass fibers per 100 parts frit, said fibers consisting substantially entirely of fibers of from 2 to 5 microns in diameter and from 20 to 100 microns in length.

BENJAMIN J. SWEO.

REFERENCES CITED

The following references are of record in the file of this patent:

UNITED STATES PATENTS

| Number | Name | Date |
| --- | --- | --- |
| 477,732 | Abbott | June 28, 1892 |
| 541,735 | Frey | June 25, 1895 |
| 1,842,970 | Hovey | Jan. 26, 1932 |
| 2,032,239 | Wedlock | Feb. 25, 1936 |

FOREIGN PATENTS

| Number | Country | Date |
| --- | --- | --- |
| 16,364 | Germany | 1881 |
| 498,525 | Great Britain | 1939 |